(12) United States Patent
Li et al.

(10) Patent No.: US 9,717,991 B2
(45) Date of Patent: Aug. 1, 2017

(54) QUALITY OF EXPERIENCE REVERSE CONTROL FOR ELECTRONIC GAMES

(71) Applicant: EMPIRE TECHNOLOGY DEVELOPMENT LLC, Wilmington, DE (US)

(72) Inventors: Daqi Li, Shaanxi (CN); Jun Fang, Shaanxi (CN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 286 days.

(21) Appl. No.: 14/409,526

(22) PCT Filed: Mar. 6, 2013

(86) PCT No.: PCT/CN2013/072231
§ 371 (c)(1),
(2) Date: Dec. 19, 2014

(87) PCT Pub. No.: WO2014/134795
PCT Pub. Date: Sep. 12, 2014

(65) Prior Publication Data
US 2015/0190717 A1    Jul. 9, 2015

(51) Int. Cl.
| A63F 13/65 | (2014.01) |
| G07F 17/32 | (2006.01) |
| A63F 13/40 | (2014.01) |
| A63F 13/30 | (2014.01) |

(52) U.S. Cl.
CPC .............. *A63F 13/65* (2014.09); *A63F 13/10* (2013.01); *A63F 13/40* (2014.09); *G07F 17/3206* (2013.01); *G07F 17/3237* (2013.01); *A63F 13/12* (2013.01); *A63F 2300/1012* (2013.01); *A63F 2300/535* (2013.01); *A63F 2300/6045* (2013.01)

(58) Field of Classification Search
USPC ........................................... 463/43
See application file for complete search history.

(56) References Cited

U.S. PATENT DOCUMENTS

| 7,331,870 B2 | 2/2008 | Smith et al. |
| 8,002,709 B1 | 8/2011 | Bady et al. |
| 2006/0141431 A1 | 6/2006 | Lee |
| 2007/0259319 A1 | 11/2007 | Stock et al. |
| 2008/0171596 A1 | 7/2008 | Hsu |

(Continued)

FOREIGN PATENT DOCUMENTS

| CN | 1227371 A | 9/1999 |
| JP | 2002239213 A | 8/2002 |

(Continued)

OTHER PUBLICATIONS

"Aversion therapy," accessed at http://web.archive.org/web/20130119113251/http://en.wikipedia.org/wiki/Aversion_therapy, last modified on Nov. 9, 2012, pp. 1-5.

(Continued)

*Primary Examiner* — Pierre E Elisca
(74) *Attorney, Agent, or Firm* — Brundidge & Stanger, P.C.

(57) ABSTRACT

Technologies and implementations for managing an experience during play of an interactive electronic game are generally disclosed.

18 Claims, 4 Drawing Sheets

(56) References Cited

U.S. PATENT DOCUMENTS

| | | | |
|---|---|---|---|
| 2008/0220865 A1 | 9/2008 | Hsu | |
| 2008/0227546 A1 | 9/2008 | Roberts | |
| 2009/0221338 A1 | 9/2009 | Stewart et al. | |
| 2010/0304864 A1 | 12/2010 | Johnson et al. | |
| 2015/0181117 A1* | 6/2015 | Park | H04N 5/23216 348/372 |

FOREIGN PATENT DOCUMENTS

| | | |
|---|---|---|
| KR | 100255877 B1 | 5/2000 |
| KR | 100822483 B1 | 4/2008 |
| KR | 1020100032707 A | 3/2010 |
| WO | 2010105034 A2 | 9/2010 |

OTHER PUBLICATIONS

"Aversion Therapy" accessed at http://web.archive.org/web/20130115145738/http://www.psychologistworld.com/behavior/aversiontherapy.php, accessed on Oct. 30, 2014, pp. 1-2.

"Doctors Want Video Game 'Addiction' Recognized?," accessed on http://hardforum.com/archive/index.php/t-1201292.html, accessed on Oct. 30, 2014, pp. 1-6.

"Internet Addictive Disorder (IAD) Diagnostic Criteria" Jan. 31, 2009. Retrieved from the Internet URL: http://web.archive.org/web/20140904055922/http://www.psycom.net/iadcriteria.html on Oct. 31, 2014, pp. 1-2.

"Video game addiction," accessed at http://web.archive.org/web/20130208112146/http://en.wikipedia.org/wiki/Video_game_addiction, last modified on Jan. 28, 2013, pp. 1-13.

Aldridge, G., "The one interrupted by E3," accessed at http://web.archive.org/web/20120611045639/http://www.thesixthaxis.com/2012/06/08/what-we-played-56/comment-page-2/, published on Aug. 6, 2012, pp. 1-4.

Byun, S., et al., "Internet Addiction: Metasynthesis of 1996-2006 Quantitative Research," Cyberpsychology & Behavior, vol. 12, No. 2, pp. 203-207 (Apr. 2009).

Drachen, A., et al., "Correlation between Heart Rate, Electrodermal Activity and Player Experience in First-Person Shooter Games," Proceedings Sandbox '10 Proceedings of the 5th ACM SIGGRAPH Symposium on Video Games, pp. 49-54 (2010).

Felicia, P., "How can violence and addiction possibly caused by digital games be avoided or managed?—In depth," accessed at http://linked.eun.org/c/document_library/get_file?p_l_id=23046&folderId=24014&name=DLFE-754.pdf, Published on Mar. 2011, pp. 1-8.

International Search Report and written opinion for counterpart International Patent Application No. PCT/CN2013/072231 mailed Dec. 5, 2013.

* cited by examiner

300 A computer program product

302 A signal bearing medium

304 Machine-readable instructions that, when executed by one or more processors, operatively enable an interactive electronic game management module to:

monitor a quality of experience (QOE) during play of an interactive electronic game, the QOE based at least in part on sensor readings from a physiological sensor communicatively coupled to the interactive electronic game;

determine if the QOE exceeds a first value;

apply a control action to the interactive electronic game in response to determination that the QOE exceeds the first value, the control action reducing the QOE of the interactive electronic game;

determine if the QOE falls below a second value, and to terminate the control action in response to determination that the QOE falls below the second value;

determine a rate at which the QOE is reduced, and to terminate the control action if the determined rate exceeds a particular value; or at least one of delay a response time by the interactive electronic game, increase a difficulty level of the interactive electronic game, adjust image quality of the interactive electronic game, or randomly pause the interactive electronic game.

| 306 a computer-readable medium | 308 a recordable medium | 310 a communications medium |

Fig. 3

QUALITY OF EXPERIENCE REVERSE CONTROL FOR ELECTRONIC GAMES

CROSS-REFERENCE TO RELATED APPLICATION

This Application is the U.S. National Stage filing under 35 U.S.C. §371 of PCT Application Ser. No. PCT/CN2013/072231 filed on Mar. 6, 2013. The disclosure of the PCT Application is hereby incorporated herein by reference in its entirety.

BACKGROUND

Unless otherwise indicated herein, the approaches described in this section are not prior art to the claims in this application and are not admitted to be prior art by inclusion in this section.

Some people may enjoy the experience of interacting with an electronic game. For example, some people may enjoy using a computing device (e.g., a console video game system, a computer, or the like) to interact with an electronic game. Additionally, some people may enjoy social aspects associated with playing electronic games with other people (e.g., over the Internet, or the like). Furthermore, some people may have difficulty controlling their desire to play such games. Additionally, some people may have difficulty controlling the amount of time they spend playing such games.

SUMMARY

Described herein are various illustrative methods for managing an experience during play of an interactive electronic game. Example methods may include monitoring a quality of experience (QoE) of the interactive electronic game, the QoE based at least in part on sensor readings from a physiological sensor communicatively coupled to the interactive electronic game, determining if the QoE exceeds a first value, and applying a control action to the interactive electronic game in response to determination that the QoE exceeds the first value, the control action reducing the QoE of the interactive electronic game.

The present disclosure also describes various example machine readable non-transitory medium having stored therein instructions that, when executed by one or more processors, operatively enable an interactive electronic game experience management module to monitor a quality of experience (QoE) during play of an interactive electronic game, the QoE based at least in part on sensor readings from a physiological sensor communicatively coupled to the interactive electronic game, determine if the QoE exceeds a first value, and apply a control action to the interactive electronic game in response to determination that the QoE exceeds the first value, the control action reducing the QoE of the interactive electronic game.

The present disclosure additionally describes example systems. Example systems may include a processor, a physiological sensor, and an interactive electronic game experience management module communicatively coupled to the processor and to the physiological sensor, the interactive electronic game experience management module configured to monitor a quality of experience (QoE) of an interactive electronic game, the QoE based at least in part on sensor readings from the physiological sensor communicatively coupled to the interactive electronic game, determine if the QoE exceeds a first value, and apply a control action to the interactive electronic game in response to determination that the QoE exceeds the first value, the control action reducing the QoE of the interactive electronic game.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are, therefore, not to be considered limiting of its scope. The disclosure will be described with additional specificity and detail through use of the accompanying drawings.

In the drawings:

FIG. 3 is an illustration of an example computer program product; and

DETAILED DESCRIPTION

Figure 1:
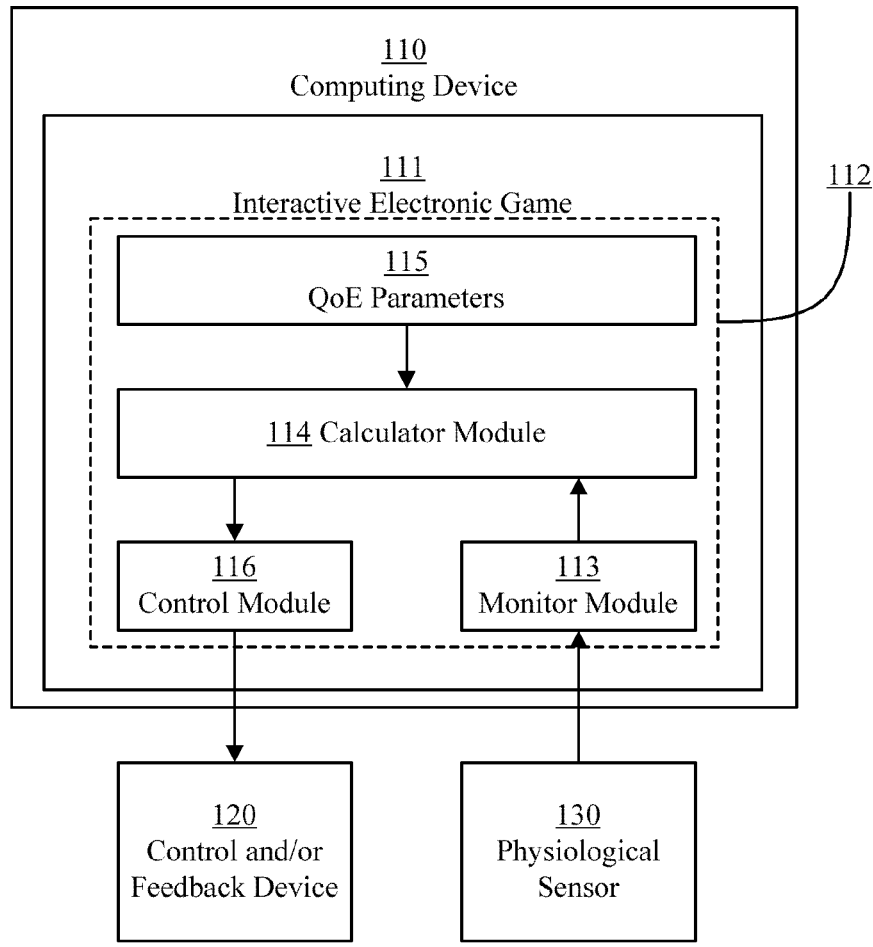
FIG. 1 is an illustration of a block diagram of an example interactive game environment.

The following description sets forth various examples along with specific details to provide a thorough understanding of claimed subject matter. It will be understood by those skilled in the art that claimed subject matter might be practiced without some or more of the specific details disclosed herein. Further, in some circumstances, well-known methods, procedures, systems, components and/or circuits have not been described in detail, in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to managing an experience during play of an electronic game.

Some people may have difficulty moderating the amount of time they spend playing electronic games. Additionally, some people may have difficulty controlling their desire to play electronic games. As a result, it may be said that playing electronic games may be habit forming. Furthermore, in some cases, the desire to play electronic games may be treated as an addiction. Conventional treatments for the addiction to electronic games may include counseling, engaging in physical activity as an alternative, and taking medication. Additionally, some treatments for the addiction to electronic games may include stays at a treatment center and hospitalization. In general, the various conventional treatments may be expensive, require specific equipment, require the assistance of trained individuals, necessitate that the patient take breaks from their normal daily routine, and/or necessitate an extended stay in a hospital or treatment center.

Various embodiments described herein may be provided for the treatment of an addiction to electronic games. Various embodiments described herein may provide that a quality of experience (QoE) of an electronic game may be degraded. For example, in some embodiments, an electronic game may include a treatment mode. Furthering this example, a user may play (e.g., interact with) the electronic game while the electronic game is in the treatment mode. While in the treatment mode, the electronic game, upon detecting certain conditions, may reduce the QoE, by, for example, reducing the performance of the game.

In some examples, the electronic game may monitor the QoE and reduce the performance of the game based at least in part upon the monitored QoE. For example, if the monitored QoE is determined to be above a threshold level, the electronic game may degrade performance accordingly. Non-limiting examples of degrading electronic game performance include, for example, introducing delay in the game, mixing the control parameters (e.g., switching left and right movement controls, adjusting the rate or movement, and/or the like), shifting and/or simplifying a display corresponding to the electronic game (e.g., adjusting the viewing angle, downgrading the resolution, and/or the like), causing portions of the game to be repeated, and the like. The electronic game may implement any action(s) or otherwise alter the electronic game in a manner as to reduce or lower the QoE of a player playing the game.

In general, an electronic game (herein sometimes referred to as "interactive game", "interactive electronic game", or "video game") may be any game played with the aid of a computing device. For example, an interactive game may be a game played on a computing device (e.g., laptop, desktop, console video game system, mobile video game system, smart phone, tablet computer, or the like). An interactive game may be a game played using specific electronic equipment (e.g., a television, a microphone, a speaker, virtual reality glasses, or the like). Furthermore, although reference is made herein to "game", various embodiments described herein may be applicable to any "habit forming" activity wherein interaction with a computing device takes place. For example, various embodiments of the present disclosure may be applicable to viewing streaming video over the Internet, browsing web pages, interacting with a social media website, interacting with a social media computing application, or the like.

As an illustrative example, various embodiments of the present disclosure may be applied to video games played using a video game console. Accordingly, a video game may be configured to monitor a QoE of the video game. For example, the video game may be configured to monitor one or more physiological state(s) of a user (also referred to herein as "player") while the user is playing the video game. Non-limiting examples of physiological states include, for example, heart rate, blood pressure, respiratory rate, and/or the like. The video game may then use the monitored physiological state(s) to determine the QoE (e.g., the QoE of the player playing the video game). If the determined QoE is above a threshold value, the video game may be configured to degrade its performance. For example, the video game may introduce delay(s), adjust control parameter(s), shift and/or simplify a displayed scene, and/or replay portions of the video game. It is to be appreciated that this example, as well as other examples provided herein are given for illustrative purposes only and are not intended to be limiting.

FIG. 1 illustrates an example interactive game environment 100, arranged in accordance with at least some embodiments described herein. The interactive game environment 100 may be implemented to degrade the QoE experienced by a player playing an interactive game upon detecting a certain condition or condition. In some examples, the interactive game environment 100 may be implemented to degrade the QoE experienced by a player playing an interactive game as part of a treatment of an addiction to the interactive game. In general, the interactive game environment 100 may monitor a QoE (e.g., of a user) of an interactive game played within the interactive game environment 100, and, based at least in part upon the monitored QoE, reduce the performance of the interactive game.

As depicted, the interactive game environment 100 may include a computing device 110 and an interactive electronic game 111. The computing device 110 may be any type of computing device upon which the interactive electronic game 111 may be played. For example, the computing device may be a laptop, a desktop, a console video game system, a mobile video game system, a smart phone, a tablet computer, or the like.

The interactive electronic game 111 may be played using a control and/or feedback device 120. The control and/or feedback device 120 may be any device configured to facilitate interaction with the interactive electronic game 111. For example, the control and/or feedback device 120 may be a display (e.g., television, computer monitor, smart phone screen, or the like) configured to display content from the interactive electronic game 111. The control and/or feedback device may be a controller (e.g., joystick, paddle, keyboard, mouse, touch screen, microphone, or the like) configured to provide control input to the interactive electronic game 111. It is to be appreciated, that in some examples, the interactive game environment 100 may include more than one control and/or feedback device. For example, the interactive game environment 100 may include both a display and a controller. Furthermore, in some embodiments, the control and/or feedback device 120 may be configured to both provide feedback and receive control input. For example, the control and/or feedback device 120 may be a touch screen. Additionally, although not shown as such in FIG. 1, the control and/or feedback device 120 may be incorporated into the computing device 110.

As depicted in FIG. 1, the interactive electronic game may include an interactive electronic game experience management module (here on out an IEGEMM) 112. The IEGEMM 112 may be configured to monitor the QoE (e.g., of a user) of the interactive electronic game 111, and, based at least in part upon the monitored QoE, reduce the performance of the interactive electronic game 111. In some examples, the IEGEMM 112 may use an application programming interface (API) of the interactive electronic game 111 to reduce the performance. In some embodiments, the IEGEMM 112 may be included as part of the interactive electronic game 111. The IEGEMM 112 may then be "enabled" or "disabled". For example, the IEGEMM 112 may be enabled or disabled by a user of the interactive electronic game 111, by an administrator of the computing device 110, after an amount of play has elapsed, or the like. In some embodiments, the IEGEMM 112 may be installed as a plug-in to the interactive electronic game 111. In some embodiments, the IEGEMM 112 may be enabled based on a particular user playing the interactive electronic game 111. For example, the IEGEMM 112 may be configured to identify the user and enable the treatment mode described above based upon identifying a particular user. For example, the IEGEMM 112 may identify a user based upon user account and/or login details. The IEGEMM 112 may identify a user based upon the computing device 110 details (e.g., a device ID, MAC address, IP address, or the like).

As stated, the IEGEMM 112 may be configured to monitor the QoE (e.g., of a user) of the interactive electronic game 111, and, based at least in part upon the monitored QoE, reduce the performance of the interactive electronic game 111. The IEGEMM 112 may include a monitor module 113. The monitor module 113 may be configured to monitor physiological state(s) of a user (e.g., while the user is playing the interactive electronic game 111, or the like). For example, the monitor module 113 may be configured to monitor physiological state(s) using a physiological sensor 130. The physiological sensor 130 may be any sensor configured to determine a physiological state. For example, the physiological sensor may be a heart rate monitor, a blood pressure monitor, a respiratory rate monitor, an electrocardiogram (EKG) monitor, an electroencephalography (EEG) monitor, and/or the like.

In some embodiments, the physiological sensor 130 may be incorporated into the control and/or feedback device 120. For example, the control and/or feedback device 120 may be a joystick controller. The joystick controller may include a heart rate monitor incorporated into the joystick controller configured to measure a heart rate. The monitor module 113 may be configured to receive the measured physiological state (e.g., heart rate, or the like) from the physiological sensor 130. In some examples, the physiological sensor 130 may be configured to periodically measure (e.g., at fixed periods, at irregular intervals, upon request from the monitor module 113, and/or the like) the physiological state. In some embodiments, more than one physiological sensor 130 may be provided. Additionally, in some embodiments, the physiological sensor 130 may be configured to measure more than one physiological state. For example, the physiological sensor 130 may be a combined heart rate and respiratory monitor.

The IEGEMM 112 may also include a calculator module 114 configured to determine the QoE of the interactive electronic game 111 from the measured physiological state(s). The calculator module 114 may also be configured to determine a control action to be applied to the control and/or feedback device 120 based upon the determined QoE and QoE parameters 115. The determined control action may be such that the performance of the interactive electronic game 111 is degraded. For example, the determined control action may be to introduce delay(s) into the interactive electronic game 111, mix control parameter(s) of the interactive electronic game 111, shift and/or simplify a displayed scene from the interactive electronic game 111, and/or replay portions of the interactive electronic game 111. Various examples of different control actions that may be determined by the calculator module 114 are provided below.

The IEGEMM 112 may also include a control module 116 configured to apply the determined control action to the interactive electronic game 111. For example, if the determined control action is to add delay to the control inputs received from the control and/or feedback device 120, the control module 116 may add the delay.

Figure 2:
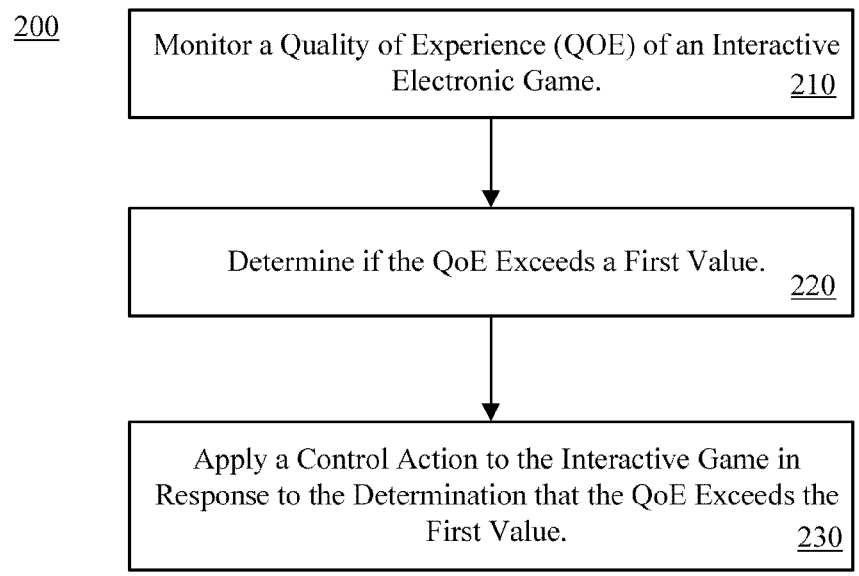
FIG. 2 is a flow chart of an example method for managing an experience during play of an interactive electronic game.

FIG. 2 illustrates a flow diagram of an example method for managing an experience during play of an interactive electronic game, arranged in accordance with at least some embodiments described herein. In some portions of the description, illustrative implementations of the method are described with reference to elements of the interactive game environment 100 depicted in FIG. 1. However, the described embodiments are not limited to these depictions. More specifically, some elements depicted in FIG. 1 may be omitted from some implementations of the methods detailed herein. Furthermore, other elements not depicted in FIG. 1 may be used to implement example methods detailed herein.

Additionally, FIG. 2 employs block diagrams to illustrate the example methods detailed therein. These block diagrams may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of claimed subject matter.

FIG. 2 illustrates an example method 200 for managing an experience during play of an interactive electronic game. In some examples, the method 200 may be employed as part of a treatment for the addiction electronic games. Beginning at block 210 ("Monitor a Quality of Experience (QoE) of an Interactive Electronic Game"), the IEGEMM 112 may include logic and/or features to monitor a QoE (e.g., of a user playing an interactive electronic game). At block 210, the monitor module 113 may receive one or more physiological measurements from the physiological sensor 130 and the calculator module 114 may determine the QoE based at least in part upon the received physiological measurements.

In some embodiments, the monitor module 113 may be configured to receive "baseline" physiological data. For example, the monitor module 113 may be configured to receive physiological data from the physiological sensor 130 within a specified period after play of the interactive electronic game 111 has begun. Subsequently, at various intervals, the monitor module 113 may be configured to receive "current" physiological data from the physiological sensor 130. The calculator module 114 may then determine the QoE based on the baseline physiological data and the current physiological data.

For example, suppose the monitor module 113 was configured to receive heart rate (p), blood pressure (bp), and respiratory rate (b). The baseline and current physiological data may be represented as weight vectors $v_{baseline} = \{w_1^{baseline}, w_2^{baseline}, w_3^{baseline}\}$ and $v_{current} = \{w_1^{current}, w_2^{current}, w_3^{current}\}$ respectively, where $w_1 = bp$, $w_2 = b$, and $w_3 = bp$. The calculator module 114 may be configured to determine a change in the QoE ($\Delta QoE$) based on the similarity of the baseline and current physiological data vectors. For example, the change in the QoE may be determined based in part upon equation [1], wherein sim is the similarity of the two vectors and may be determined based in part upon equation [2].

$$\Delta QoE = 1 - sim(v_{baseline}, v_{current}) \qquad [1]$$

$$sim(v_{baseline}, v_{current}) = 1 - \frac{v_{baseline} \cdot v_{current}}{v_{baseline} \times v_{current}} \qquad [2]$$

$$= 1 - \frac{\sum_{j=1}^{3} w_j^{baseline} \times w_j^{current}}{\sqrt{\sum_{j=1}^{3} (w_j^{baseline})^2} \times \sqrt{\sum_{i=1}^{3} (w_i^{current})^2}}$$

Continuing from block 210 to block 220 ("Determine if the QoE Exceeds a First Value"), the IEGEMM 112 may include logic and/or features to determine if the QoE exceeds a first value. At block 220, the calculator module 114 may be configured to determine if the QoE exceeds a threshold value. For example, the calculator module 114 may be configured to determine if the QoE exceeds a threshold value represented by the QoE parameters 115. In some embodiments, the calculator module 114 may determine if the change in the QoE exceeds a threshold value.

Continuing from block 220 to block 230 ("Apply a Control Action to the Interactive Game in Response to the Determination that the QoE Exceeds the First Value"), the IEGEMM 112 may include logic and/or features to apply a control action to the interactive electronic game 111 based on the determination that the QoE exceeds a first value. At block 230, the control module 116 may be configured to apply a control action to the control and/or feedback device 120 in an attempt to lower the QoE of the interactive electronic game 111.

In some embodiments, the control module 116 may be configured to add delay to the interactive electronic game 111. For example, the control module 116 may add a delay into the inputs received from the control and/or feedback device 120. As another example, the control module 116 may add a delay into the feedback and/or outputs sent to the control and/or feedback device 120. In some embodiments, the control module 116 may be configured to mix the control parameters. For example, a movement input may be reversed (e.g., forward becomes backward and vice versa). As another example, the parameter that affects the speed with which movement occurs may be adjusted (e.g., slow movement becomes faster, fast movement becomes slower, or the like). In some embodiments, the control module 116 may be configured to shift and/or simplify the display. For example, the resolution of any displayed content may be lowered. Additionally, items within a scene or portions of the scene may be rearranged. In some embodiments, the control module 116 may be configured to repeat portions of the game. For example, specific missions and/or objectives may be repeated.

In some embodiments, the type of control action may be based in part upon the interactive electronic game 111. For example, if the interactive electronic game 111 is a first person shooter game, then the control module 116 may add delay and/or mix the control parameters. In some embodiments, the type of control action may be based in part upon an objective of the interactive electronic game 111. For example, if the interactive electronic game 111 is a flight simulator game wherein an objective is to accomplish particular missions, the control module 116 may cause that already completed missions be repeated.

With some embodiments, the methods described herein may be performed in an iterative fashion. For example, the method 200 may be repeated. In some embodiments, during subsequent iterations of the method 200, the calculator module 114 may, at block 210, determine a decrease in the QoE. For example, the monitor module may receive updated physiological data and then determine a decrease in the QoE based in part upon the updated physiological data ($v_{updated}$). In some embodiments, the monitor module may be configured to receive physiological data near the time point when the control module 116 starts to apply the control action ($v_{control\ applied}$), for example, at or near block 230. Updated physiological data may be received at some interval after application of the control action (e.g., at a subsequent iteration of block 210, or the like). In some example, the decrease in the QoE ($D_{QoE}$) may be determined based in part upon equation [3], where n is a coefficient $1 \geq n > 0$.

$$D_{QoE} = n \cdot \frac{sim(v_{baseline}, v_{updated})}{1 - sim(v_{control\ applied}, v_{updated})} \qquad [3]$$

In some embodiments, the calculator module 114 may, at block 220, determine whether $D_{QoE}$ exceeds a threshold value. The control module 116 may cease applying the control action (e.g., at block 230) based on the determination that $D_{QoE}$ exceeds the threshold value.

In general, the method described with respect to FIG. 2 and elsewhere herein may be implemented as a computer program product, executable on any suitable computing system, or the like. For example, a computer program product for managing an experience during play of an interactive electronic game may be provided. Example computer program products are described with respect to FIG. 3 and elsewhere herein.

FIG. 3 illustrates an example computer program product 300, arranged in accordance with at least some embodiments described herein. Computer program product 300 may include machine readable non-transitory medium having stored therein instructions that, when executed, cause the machine to manage an experience during play of an interactive electronic game according to the processes and methods discussed herein. Computer program product 300 may include a signal bearing medium 302. Signal bearing medium 302 may include one or more machine-readable instructions 304, which, when executed by one or more processors, may operatively enable a computing device to provide the functionality described herein. In various examples, some or all of the machine-readable instructions may be used by the devices discussed herein.

In some examples, the machine readable instructions 304 may include monitoring a quality of experience (QoE) during play of an interactive electronic game, the QoE based at least in part on sensor readings from a physiological sensor communicatively coupled to the interactive electronic game. In some examples, the machine readable instructions 304 may include determining if the QoE exceeds a first value. In some examples, the machine readable instructions 304 may include applying a control action to the interactive electronic game in response to determination that the QoE exceeds the first value, the control action reducing the QoE of the interactive electronic game. In some examples, the machine readable instructions 304 may include determining if the QoE falls below a second value, and to terminate the control action in response to determination that the QoE falls below the second value. In some examples, the machine readable instructions 304 may include determining a rate at which the QoE is reduced, and to terminate the control action if the determined rate exceeds a particular value. In some examples, the machine readable instructions 304 may include at least one of delay a response time by the interactive electronic game, increase a difficulty level of the interactive electronic game, adjust image quality of the interactive electronic game, or randomly pause the interactive electronic game.

In some implementations, signal bearing medium 302 may encompass a computer-readable medium 306, such as, but not limited to, a hard disk drive (HDD), a Compact Disc (CD), a Digital Versatile Disk (DVD), a digital tape, memory, etc. In some implementations, the signal bearing medium 302 may encompass a recordable medium 308, such as, but not limited to, memory, read/write (R/W) CDs, R/W DVDs, etc. In some implementations, the signal bearing medium 302 may encompass a communications medium 310, such as, but not limited to, a digital and/or an analog communication medium (e.g., a fiber optic cable, a waveguide, a wired communication link, a wireless communication link, etc.). In some examples, the signal bearing medium 302 may encompass a machine readable non-transitory medium.

In general, the methods described with respect to FIG. 2 and elsewhere herein may be implemented in any suitable computing system and/or interactive electronic game. Example systems may be described with respect to FIG. 4 and elsewhere herein. In general, the system may be configured to manage an experience during play of an interactive electronic game.

Figure 4:
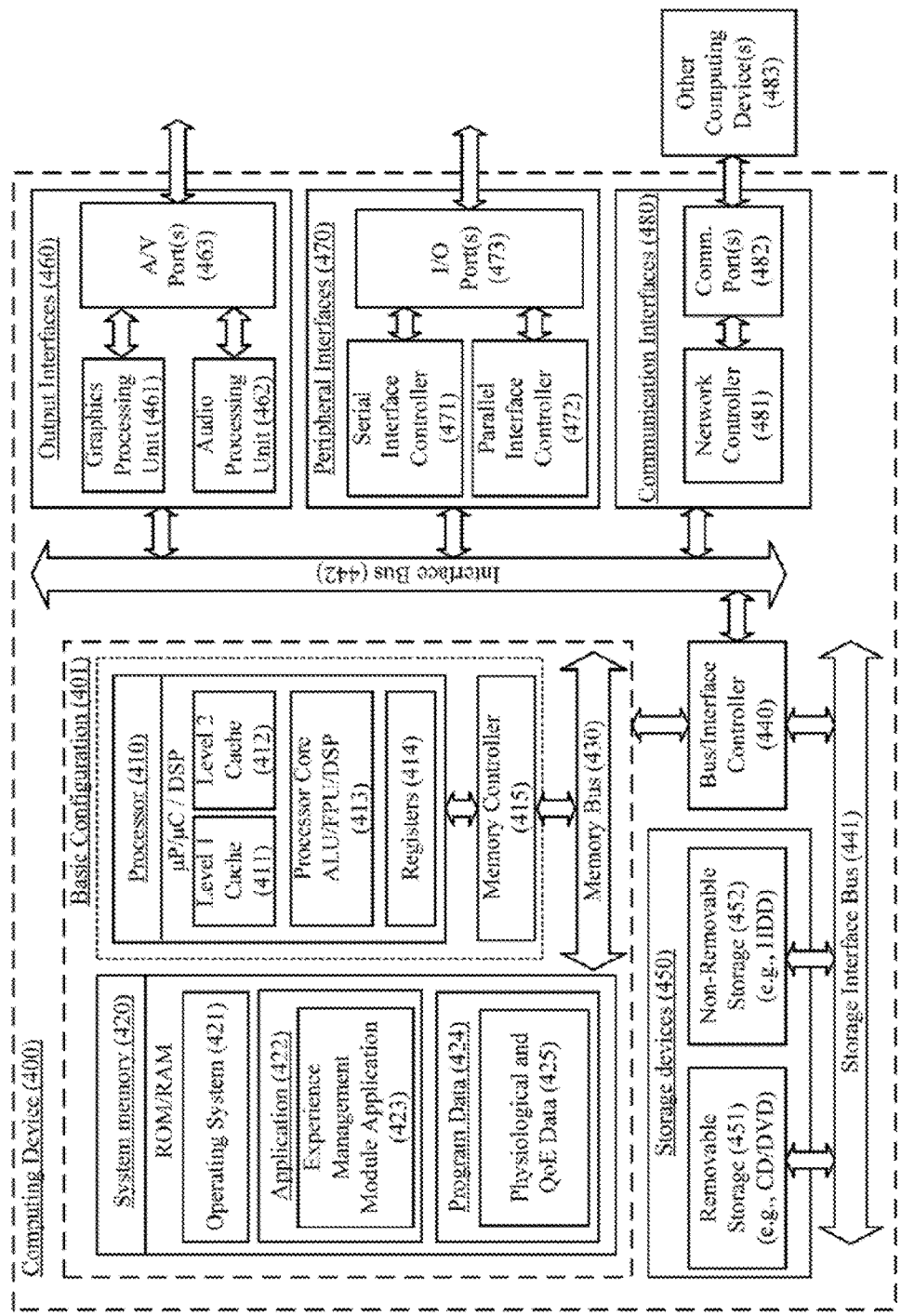
FIG. 4 is an illustration of a block diagram of an example computing device, all arranged in accordance with at least some embodiments described herein.

FIG. 4 is a block diagram illustrating an example computing device 400, arranged in accordance with at least some embodiments described herein. In various examples, computing device 400 may be configured to manage an experience during play of an interactive electronic game as discussed herein. In one example of a basic configuration 401, computing device 400 may include one or more processors 410 and a system memory 420. A memory bus 430 can be used for communicating between the one or more processors 410 and the system memory 420.

Depending on the desired configuration, the one or more processors 410 may be of any type including but not limited to a microprocessor (µP), a microcontroller (µC), a digital signal processor (DSP), or any combination thereof. The one or more processors 410 may include one or more levels of caching, such as a level one cache 411 and a level two cache 412, a processor core 413, and registers 414. The processor core 413 can include an arithmetic logic unit (ALU), a floating point unit (FPU), a digital signal processing core (DSP Core), or any combination thereof. A memory controller 415 can also be used with the one or more processors 410, or in some implementations, the memory controller 415 can be an internal part of the processor 410.

Depending on the desired configuration, the system memory 420 may be of any type including but not limited to volatile memory (such as RAM), non-volatile memory (such as ROM, flash memory, etc.) or any combination thereof. The system memory 420 may include an operating system 421, one or more applications 422, and program data 424. The one or more applications 422 may include experience management module application 423 that can be arranged to perform the functions, actions, and/or operations as described herein including the functional blocks, actions, and/or operations described herein. The program data 424 may include physiological and QoE data 425 for use with the experience management module application 423. In some example embodiments, the one or more applications 422 may be arranged to operate with the program data 424 on the operating system 421. This described basic configuration 401 is illustrated in FIG. 4 by those components within dashed line.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The one or more data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 420, the removable storage 451 and the non-removable storage 452 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 442 for facilitating communication from various interface devices (e.g., output interfaces, peripheral interfaces, and communication interfaces) to the basic configuration 401 via the bus/interface controller 440. Example output interfaces 460 may include a graphics processing unit 461 and an audio processing unit 462, which may be configured to communicate to various external devices such as a display or speakers via one or more A/V ports 463. Example peripheral interfaces 470 may include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication interface 480 includes a network controller 481, which may be arranged to facilitate communications with one or more other computing devices 483 over a network communication via one or more communication ports 482. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 400 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 400 may also be implemented as a personal computer including both laptop computer and non-laptop computer configurations. In addition, the computing device 400 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method to manage an experience during play of an interactive electronic game, wherein the interactive electronic game comprises an interactive electronic game experience management module, the method comprising:

monitoring, by the interactive electronic game experience management module, a quality of experience (QoE) of the interactive electronic game, the QoE based at least in part on sensor readings from a physiological sensor that is configured to periodically monitor one or more physiological state(s) of a user while the user plays the interactive electronic game, and wherein the physiological sensor is communicatively coupled to the interactive electronic game;

determining, by the interactive electronic game experience management module, when the QoE exceeds a first value;
applying, by the interactive electronic game experience management module, a control action to the interactive electronic game in response to the determination that the QoE exceeds the first value, wherein applying the control action reduces the QoE of the interactive electronic game;
determining, by the interactive electronic game experience management module, when the QoE falls below a second value; and
terminating, by the interactive electronic game experience management module, the control action to the interactive electronic game in response to the determination that the QoE falls below the second value.

2. The method of claim 1 further comprising:
determining a rate at which the QoE is reduced; and
terminating the control action when the determined rate exceeds a particular value.

3. The method of claim 1, wherein applying the control action comprises at least one of:
delaying a response time by the interactive electronic game, increasing a difficulty level of the interactive electronic game, adjusting image quality of the interactive electronic game, or randomly pausing the interactive electronic game.

4. The method of claim 1, wherein applying the control action comprises applying the control action in a subtle manner.

5. The method of claim 1, wherein monitoring the QoE of the interactive electronic game based on sensor readings from the physiological sensor comprises monitoring facial expressions based on sensor readings from a physiological sensor.

6. The method of claim 1, wherein monitoring the QoE of the interactive electronic game based on sensor readings from the physiological sensor comprises monitoring blood pressure based on sensor readings from a physiological sensor.

7. A machine readable non-transitory medium having stored therein instructions that, when executed by one or more processors, operatively enable an interactive electronic game experience management module to:
monitor a quality of experience (QoE) during play of an interactive electronic game, wherein the QoE is based at least in part on sensor readings from a physiological sensor that is configured to periodically monitor one or more physiological state(s) of a user while the user plays the interactive electronic game, and wherein the physiological sensor is communicatively coupled to the interactive electronic game;
determine when the QoE exceeds a first value;
apply a control action to the interactive electronic game in response to the determination that the QoE exceeds the first value, wherein the application of the control action reduces the QoE of the interactive electronic game;
determine when the QoE falls below a second value; and
terminate the control action to the interactive electronic game in response to the determination that the QoE falls below the second value.

8. The machine readable non-transitory medium of claim 7, wherein the stored instructions that, when executed by the one or more processors, further operatively enable the interactive electronic game experience management module to determine a rate at which the QoE is reduced, and to terminate the control action when the determined rate exceeds a particular value.

9. The machine readable non-transitory medium of claim 7, wherein the stored instructions that, when executed by the one or more processors, further operatively enable the interactive electronic game experience management module to at least one of: delay a response time by the interactive electronic game, increase a difficulty level of the interactive electronic game, adjust image quality of the interactive electronic game, or randomly pause the interactive electronic game.

10. The machine readable non-transitory medium of claim 7, wherein the stored instructions that, when executed by the one or more processors, further operatively enable the interactive electronic game experience management module to apply the control action in a subtle manner.

11. The machine readable non-transitory medium of claim 7, wherein the stored instructions that, when executed by the one or more processors, further operatively enable the interactive electronic game experience management module to obtain sensor readings from a physiological sensor configured to monitor facial expressions.

12. The machine readable non-transitory medium of claim 7, wherein the stored instructions that, when executed by the one or more processors, further operatively enable the interactive electronic game experience management module to obtain sensor readings from a physiological sensor configured to monitor blood pressure.

13. A system to manage an experience during play of an interactive electronic game, the system comprising:
a processor;
a physiological sensor; and
an interactive electronic game experience management module communicatively coupled to the processor and to the physiological sensor, wherein the interactive electronic game experience management module is configured to:
monitor a quality of experience (QoE) of the interactive electronic game, the QoE based at least in part on sensor readings from the physiological sensor that is configured to periodically monitor one or more physiological state(s) of a user while the user plays the interactive electronic game, and wherein the physiological sensor is communicatively coupled to the interactive electronic game;
determine when the QoE exceeds a first value;
apply a control action to the interactive electronic game in response to the determination that the QoE exceeds the first value, wherein the application of the control action reduces the QoE of the interactive electronic game;
determine when the QoE falls below a second value; and
terminate the control action to the interactive electronic game in response to the determination that the QoE falls below the second value.

14. The system of claim 13, wherein the interactive electronic game experience management module is further configured to determine a rate at which the QoE is reduced, and to terminate the control action when the determined rate exceeds a particular value.

15. The system of claim 13, wherein the interactive electronic game experience management module is further configured to at least one of: delay a response time by the interactive electronic game, increase a difficulty level of the interactive electronic game, adjust image quality of the interactive electronic game, or randomly pause the interactive electronic game.

16. The system of claim 13, wherein the interactive electronic game experience management module is further configured to apply the control action in a subtle manner.

17. The system of claim 13, wherein the physiological sensor comprises a physiological sensor configured to monitor facial expressions.

18. The system of claim 13, wherein the physiological sensor comprises a physiological sensor configured to monitor blood pressure.

\* \* \* \* \*